March 1, 1966 F. E. BECKER ETAL 3,237,935

STACK POSITIONING DOCUMENT HOPPER FEED

Filed Feb. 17, 1964 3 Sheets-Sheet 1

INVENTORS
FRANK E. BECKER
KAREL dEN TEX

BY John A. Brady
ATTORNEY.

March 1, 1966 F. E. BECKER ETAL 3,237,935

STACK POSITIONING DOCUMENT HOPPER FEED

Filed Feb. 17, 1964

3 Sheets-Sheet 2

March 1, 1966 F. E. BECKER ETAL 3,237,935

STACK POSITIONING DOCUMENT HOPPER FEED

Filed Feb. 17, 1964 3 Sheets-Sheet 3

United States Patent Office 3,237,935
Patented Mar. 1, 1966

3,237,935

STACK POSITIONING DOCUMENT HOPPER FEED

Frank E. Becker and Karel den Tex, Lexington, Ky., assignors to International Business Machines Corporation, New York, N.Y., a corporation of New York Filed Feb. 17, 1964, Ser. No. 345,176
14 Claims. (Cl. 271—62)

This invention relates to the positioning of stacked sheets. In particular, this invention relates to the positioning of sheets of uneven thickness so that the top of a stack of such sheets is presented in substantially the same plane regardless of the number of sheets in the stack. The invention is suited for use to level the top of a stack of documents to present them for feeding into data processing equipment.

Record carrying sheets are now in use which are of one thickness at one point along their length and a second thickness at a different point. At least one technique utilizes a relatively narrow magnetic stripe permanently attached transversely across the width of a document. Most of the document is typed or printed upon with letters and numerals to display and record information. The narrow magnetic stripe serves as a high speed, electrical memory. Information is read from and recorded on the magnetic strip in addition to being printed or typed in the conventional manner on the remainder of the document. At least one card of this kind is 0.010 inch thick at the magnetic stripe while the remainder of the card is 0.007 inch thick. Stacking of such cards on a horizontal surface with all of the magnetic stripes oriented together results in a stack with a high side and a low side.

It would be possible to stack such uneven cards in a hopper upon a vertically movable, horizontal bed. The moving bed could automatically be raised to advance the cards to the top or feeding part, of the hopper. In such a case, however, the top document of a large stack of documents would be presented at the feeding means at an angle considerably tilted from the horizontal. This is unsatisfactory for several reasons.

A basic disadvantage in the feeding of documents from a tilted stack arises when the feeding means is operated in conjunction with a stack top sensing switch of the type well known in the art. It is generally desired, of course, to bring the top of a stack of documents to a point even with a document feed path. It is known to locate a switch at the level of the document feed path so that the top of a vertically movable stack of documents activates the switch to prevent further vertical feed of the document stack. A tilted stack of documents, however, has a different elevation depending upon where in the stack top is sensed and also depending upon the number of documents in the stack. The usefulness of the stack top sensing switch is thus greatly impaired. It is possible to locate the siwtch at the very end of the stack of documents where the document feed path and the side of the document stack merge. This would render the stack top sensing switch accurate for its purpose. However, the tolerances are prohibitively exacting. Any variation in the position of the switch results in the complete failure to sense the document stack or in the inaccuracies discussed above in locating the position of the top of the document stack.

Less basic disadvantages exist in the feeding of documents from a tilted stack. First, it should be noted that the documents would probably have to be arranged so that the low side of a tilted stack would face the document feed path. This is true because the documents tend to slide under the influence of gravity along the inclination of the tilted stack. If the inclination of the tilted stack faced away from the card feed path, the documents would tend to slide away from the feed means. However, even when the disadvantages of this sliding tendency are minimized by feeding from the low end of the stack, the high end of the stack still projects upward to an exaggerated height. Either the sides of the hopper must be enlarged or the edges of the cards will be burred and otherwise damaged against the rim of the hopper as the documents are pulled into the document feed path. Furthermore, when the documents are fed from the low side of a stack they tend to slide from the stack into the card feed path even when it is desired to inhibit feed. This sliding, of course, is another possible source of complications.

Means have been devised to prevent a double or multiple feed of documents by forcing the bottom documents back from the feed path. It is desirable in this arrangement that the hopper stack be relatively level so that document return will not be impaired.

It also should be recognized that the symmetry and the aesthetic conformation of such a device is important. Data processing equipment is best appreciated by the users and is therefore put to most efficient use when the equipment appears to be smoothly functional. An awkward appearing input means at the very point where operators and users often focus their attention is undesirable and may tend to reduce confidence in the actual functioning machine.

It might be thought that some advantage could be obtained by journalling a single plate at a point away from and approximately even with the start of the document feed path. The difficulties in accurately locating the top of a stack with a sensing switch remain, however. Furthermore, the configuration presented to the user is undesirable. To insert a stack of documents the user must raise the documents over the pivot point at the plate and even then carry them down into the deep angle formed by the plate when it is withdrawn to receive a stack of documents. This is difficult and fatiguing.

It is a primary object of this invention to provide means to present a stack of uneven thickness documents in a horizontal or slightly tipped position at the top of the stack regardless of the number of documents in the stack.

It is a further object of this invention to provide a bed which moves vertically and takes different conformations depending upon the position of the bed.

It is a more specific object of this invention to provide means to position a stack of sheets, each sheet containing a thick portion at one point on the sheet and a thinner portion over the majority of the sheet, with the movement automatically presenting a substantially level stack top as the sheets are moved upward in a hopper and fed off of the stack.

In accomplishing the above objects it is desirable that the mechanism not consume space which might otherwise be usable as part of the hopper. It is also desirable that documents in the hopper not be exposed by slots or other openings in the sides of the hopper required by the mechanism. For such reasons is was considered highly desirable to devise a mechanism that is primarily underneath the document stack when it is placed in the hopper. It is a feature of this invention that the mechanism devised is particularly suitable to location primarily under a stack of documents and away from the hopper.

In accordance with the invention two document feeding bed plates are provided. Both plates are linked to a guide arm. The guide arm is on a pivot and is power turned through motor means. As this arm pivots, a component of motion is in the stack presenting direction and it is this component of motion which moves the two bed plates to move the stack to card feeding level. As the guide arm turns, it also controls a rotation of the two beds. The linkages to each bed define the movement of the bed in response to the movement of the guide arm. One bed plate is linked to define a greater angle with the horizontal than the other when the two plates are retracted to receive a large stack of documents. This configuration is adapted to receive and at least partially level the top of an uneven stack of documents.

In accordance with a more specific aspect of the invention one bed plate is linked rigidly at an angle to the guide arm. Its movement is therefore in a one to one angular relationship with the rotation of the guide arm. The linkages to the second bed plate move the second bed plate to take up an angular position which is a different function of the angular movement of the guide arm. The rigid position of the first bed plate and linkages of the second bed plate are selected so that both bed plates will be approximately horizontal when the guide arm has fed an entire stack and so that both bed plates will at least approximately level the top of an uneven stack when they are retracted.

In accordance with a more specific aspect of the preferred embodiment, the second bed plate is pivoted on the guide arm. It is linked through a rigid member to a second positioning arm which is pivoted at a point beyond the guide arm pivot point and the card stack. Thus an eccentric relationship is created whereby the second bed plate is offset at an angle less than the first bed plate as the guide arm is moved to directly increase the angle of the first bed plate.

The foregoing and other objects, features, and advantages of the invention will be apparent from the following more particular description of a preferred embodiment of the invention, as illustrated in the accompanying drawings.

*Structure of the invention*

Figure 1:
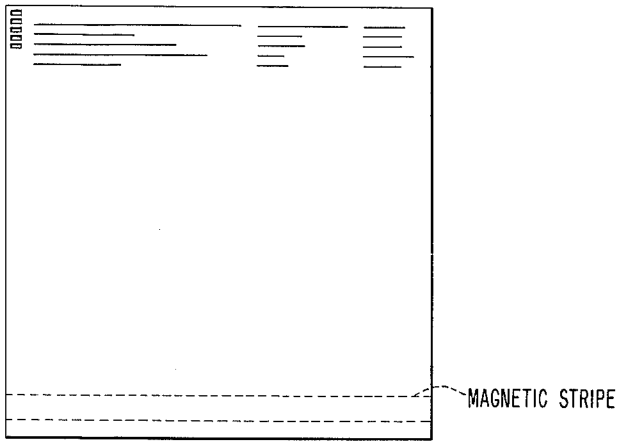
FIG. 1 shows one of the cards which are to be stacked and presented horizontally.

FIG. 1 illustrates the type of sheet with which the preferred embodiment is concerned. The sheet is a thin, flat sheet of heavy paper. It will be typed or printed upon to display the results of data processing done in connection with the sheet. The sheet carries information needed in the data processing operation on a horizontal magnetic stripe. The stripe must be of ferromagnetic material, and this requires an increased thickness. In the preferred embodiment the documents to be positioned are 0.007 inch thick at the paper and 0.010 inch thick at the stripe. In the preferred embodiment the strip extends entirely across the sheet. It will be clear, however, that the invention is usable with sheets only partially striped or with uneven sheets of different configurations.

Figure 2:
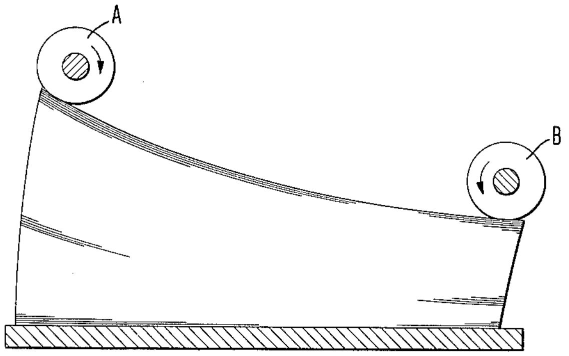
FIG. 2 illustrates the posture of a stack of the cards of FIG. 1 when no provision is made for their uneven thickness.

FIG. 2 shows the cards resting on a horizontal bed in a stack. The cards, of course, are stacked with the stripe portion oriented identically on each card. It is desired to feed the documents into a feed path. However, if the documents are fed toward the left in FIG. 2 by a roller A, they are on an incline. The disadvantages pointed out in the introduction of this specification occur. If the documents are fed toward the right of FIG. 2 by a roller B, the cards slope downward and the further disadvantages discussed above occur. The invention herein described recognizes the desirability of the top of the stack being kept relatively flat, regardless of the height of the stack, and provides a means for accomplishing such positioning.

Figure 3:
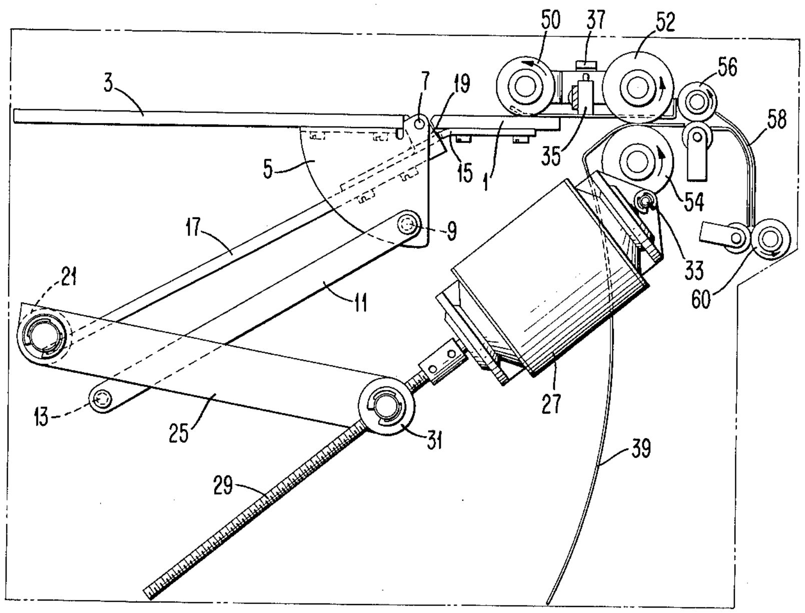
FIG. 3 shows the operative elements of the card positioner of this invention when fully extended to hold only one or a very few cards.
Figure 4:
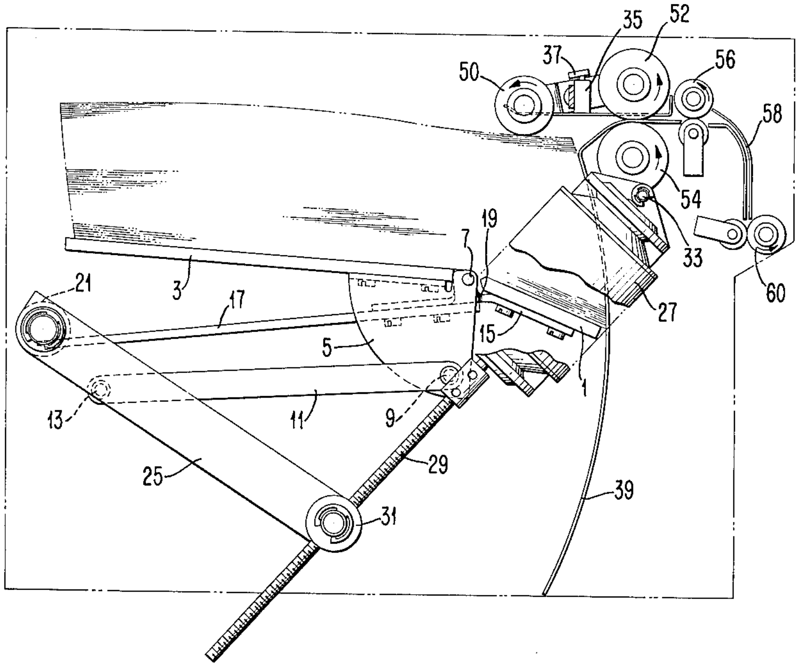
FIG. 4 illustrates the mechanism of FIG. 3 when at a withdrawn position to receive a relatively large stack of cards.

To fully understand the movements involved, reference is made to FIGS. 3 and 4. FIG. 3 shows the stack positioner at its fully extended position, where it would hold one or a very few documents. FIG. 4 shows the posture of the stack positioner when it is retracted to hold a large number of documents.

Both FIG. 3 and FIG. 4 show the first bed plate 1 and a second bed plate 3. The second bed plate 3 is supported by a flange plate 5, which is rigidly mounted to the second bed plate 3. For purposes of clarity of description only one flange plate 5 is shown. It will be made evident below that a second identical flange plate and its associated structure is located on the other side of the plate 3. The flange plate 5 is journalled on a floating pin 7, and also journalled at a stud 9 to a positioning rod 11. The positioning rod 11 is a rigid member which is journalled to the frame (not shown) by a stud 13.

The first bed plate 1 is rigidly connected by an angled tab plate 15 to a rotating guide plate 17. The guide plate 17 is journalled to the floating stud 7 by a rigid bracket 19. The guide plate 17 is integral with the circumference of a cylindrical shaft 21. The shaft 21 is journalled to the frame (not shown). Integral with the shaft 21 is the power arm 25.

Power and positioning is in response to the reversible motor 27, which drives lead screw 29. Lead screw 29 meshes with positioning block 31 to which power arm 25 is journalled for free rotary motion. The motor 27 may be journalled to the frame (not shown) by the journaling stud 33. The motor 27 is controlled by the switch 35. The switch 35 is closed by the switching projection 37. The documents when stacked are guided by a document guide 39.

*Environment of the invention*

Figure 5:
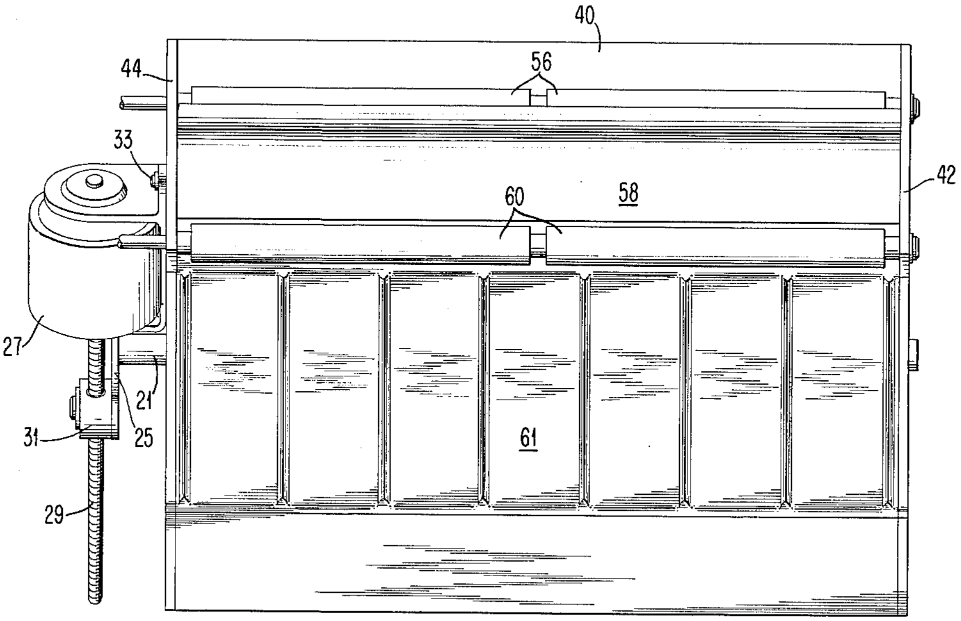
FIG. 5 shows a front view of the positioner with enough environment so that the complete structure will be clear.
Figure 6:
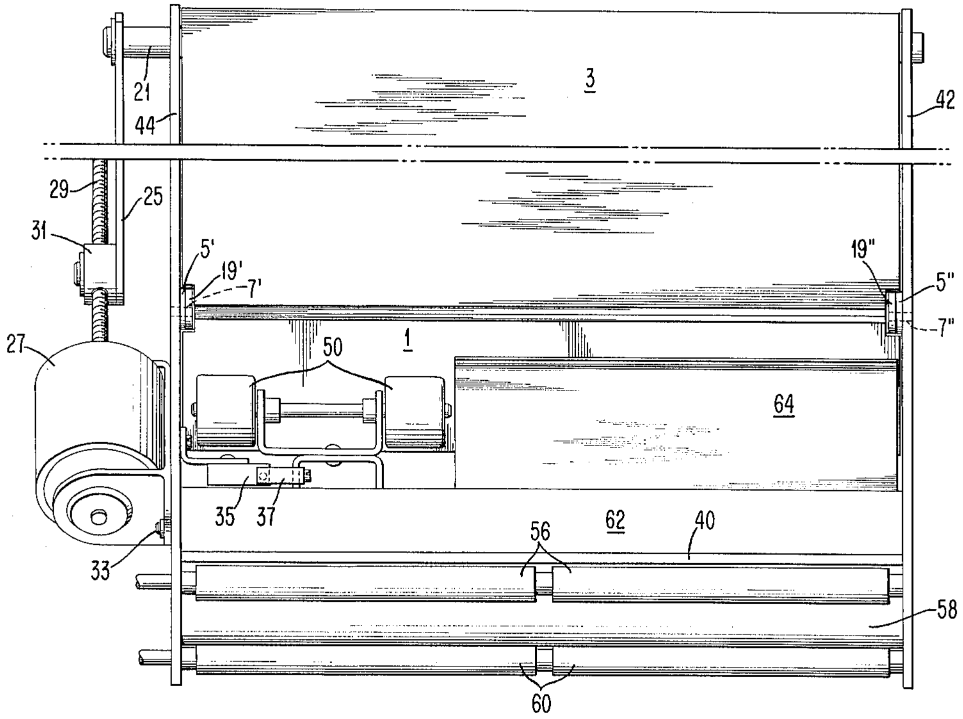
FIG. 6 shows a top view of the positioner and its environment with no cards on the bed plates.

FIG. 5 and FIG. 6 will not be discussed in great detail, since the invention is best understood with reference to FIGS. 3 and 4. FIGS. 5 and 6 do make the environment and dimensions of the invention clearer. FIG. 5 is a front view from the direction in which documents are to be fed. A stack of documents can not be seen when the device is viewed from the front. FIG. 5 is of interest in that it shows the front cross member of the document hopper 40 and frame members 42 and 44 which extend back to also form sides of the document hopper. The other parts directly related to the invention shown in FIG. 5 are the motor 27, journalled at 33; the lead screw 29; positioning block 31; and power arm 25. A small portion of the shaft 21 can be seen beneath the motor 27.

The other portions shown in FIG. 5 are portions of the card feed path and serve to put the invention of this specification in its environment. Reference is made once again to FIGS. 3 and 4 so that the document feed path can be explained. A picker roll 50 rests on the top of the document stack and makes a friction contact which forces the top document to the right of FIGS. 3 and 4. The document so moved goes between separator rolls 52 and 54.

Separator rolls 52 and 54 will not be distinguished from the prior art in this specification since they form no part of the claims. It should be noted, however, that separator rolls 52 and 54 rotate in the same direction. The top roll 52 therefore tends to move a document further in the document feed direction while the botom roll 54 tends to force a document back into the hopper. The two rolls are separated more than the thickness of one document but less than the thickness of two documents. Should two documents appear at the separator rolls 52 and 54, the top document is continued along the card feed path by top separator roll 52. The bottom document is driven back into the hopper by the bottom separator roll 54. It is one of the features of the invention herein described that it is particularly useful with this separator roll combination. It is easier to hold the bottom document back when the top of the stack of documents is relatively horizontal.

Continuing the discussion of document feed, it should be clear that a document passing separator rolls 52 and 54 is gripped by a constantly rotating feed roll 56 and enters guide housing 58. At a further point the document is gripped by a second constantly rotating feed roll 60 and is pulled further in the card feed direction.

The remaining structure of FIG. 5 now should be evident. The parts seen at the front are the constantly rotating feed roll 56, the guide housing 58, and the constantly rotating feed roll 60. Guiding along further areas of the card feed path is accomplished by outer guide panel 61.

FIG. 6 is quite informative in showing the dimensions of the invention as incorporated into the preferred embodiment. FIG. 6 also shows the motor 27, the journaling at 33, the lead screw 29, the positioning block 31, and the power arm 25. FIG. 6 is much clearer than FIG. 5 in showing the shaft 21. The shaft 21 extends across the entire hopper. The guide plate 17 (shown in FIGS. 3 and 4) is rigidly mounted to the shaft 21 and is as wide as the hopper.

FIG. 6 is particularly helpful in showing the width of the bed plates 1 and 3. The rigid bracket 19 of FIGS. 3 and 4 is seen to be implemented by two such brackets 19' and 19'' on each side of the hopper. Similarly, the flange plate 5, connected to the bed plate 3, is seen to be implemented by two flange plates 5' and 5'' on each side of the hopper; and two floating studs 7' and 7'' are used. The guide plate 17 (see FIGS. 3 and 4) extends beneath and entirely across the hopper. It is evident that this balanced arrangement provides a strong support with a minimum of structure. The positioning rod 11 (not shown in FIG. 6) is, of course, emplemented by two such rods and their associated structures, each associated with one of the flange plates 5' and 5''.

FIG. 6 further shows the picker roll 50, the switching projection 37, and the switch 35. These act together as a stack top sensing switch. Cards are fed by the picker roll 50 to the feed roll 56, through the guide housing 58, and to the feed roll 60. The flat member 62 is a lateral support for the hopper. The flat member 64 is an upper document guide to guide documents somewhat as they are moved into the feed path. The preferred embodiment of the invention feeds various width documents from one side. This is to accommodate documents of varying width in a system in which it is desirable to have one side of narrow documents roughly at a given place. This construction of the preferred embodiment should not limit the invention. Clearly the picker rolls could be centered or similarly changed in position and the hopper need be no wider than a preselected document width.

*Operation of the invention*

Operation of the stack positioning device is as follows: Reference is made to FIGS. 3 and 4. FIG. 3 shows the bed plates 1 and 3 horizontal. To retract the plates 1 and 3 for reception of a stack of uneven documents the motor 27 is caused to turn so that the lead screw 29 forces the positioning block downward. The directions obtained depend upon the turn of the threads in the meshing units: lead screw 29 and positioning block 31. Proper selection is made so that the positioning block 31 is forced down. The power arm 25 is journalled to the frame by shaft 21. The motor 27 is forced counterclockwise on journaling stud 33 so that the parts do not jam.

The power arm 25 is also journalled to the positioning block 31 and therefore turns freely to take up an angular position which increases in a clockwise direction as the positioning block 31 moves downwardly. The power arm 25, however, is rigidly connected to the cylindrical shaft 21. The angular position of the shaft 21 therefore follows the angular position of the power arm 25. The shaft 21 is journalled to the frame.

The rotating guide plate 17 is integral with the shaft 21. A one to one angular movement therefore occurs with the rotating guide plate 17 moving the same angular amounts as the power arm 25. Angled tab plate 15 rigidly holds the first bed plate 1 at a horizontal position when fully raised. As the rotating guide plate 17 moves clockwise, a downward component of motion exists which moves the first bed plate 1 down to receive a stack of documents. The angle moved by rotating guide plate 17 is directly transmitted to the plate 1 because of the rigid connection between the two. In retraction, therefore, the plate 1 takes on a relatively steep angle, as shown by FIG. 4. This angle, which is proportioned to the height of the stack of documents, insures that the side of the stack under the picker roll 50 is lowered a greater amount with larger stacks.

The position of the second bed plate 3 is controlled by an articulated linkage rather than by a rigid connection which would create a one to one relationship with the rotating guide plate 17. As the rotating guide plate 17 moves clockwise, the floating stud 7 is carried with it through rigid bracket 19. The positioning rod 11 is pivoted to the flange plate 5 by stud 9, and the flange plate 5 is integral with the second bed plate 3 and pivoted to the floating stud 7. Thus, the floating stud 7 transmits force through the flange plate 5 to the positioning rod 11. The positioning rod 11 is pivoted with the frame at stud 13 and driven through flange plate 5. It therefore must rotate in the same angular direction as the rotation of floating stud 7. The flange 5 defines a fixed distance between the floating shaft 7 and the journaling stud 9 on positioning rod 11.

An important relationship in the specific embodiment is that of the arcs traced by the stud 9 and the floating stud 7. It will be noted that the positioning rod 11 is journalled by stud 13 at a point away from both the bed plate 3 and the shaft 21 and also at a point beneath the second bed plate 3. The arc traced by the stud 9 therefore converges to a moderate extent with that of the floating stud 7 as the floating stud 7 moves downward. The positioning rod 11 must be moved by the linkage to a place at which the fixed distance between 7 and 9 is accommodated. The moderately converging arcs demand a moderate change in angle to thus result in a moderate upward tipping of bed plate 3 as the floating stud 7 moves downward.

Another way to view the positioning of the second bed plate 3 is to view it as responding to two movements. It tends to be tipped in a one to one angular relationship with the movement of the floating stud 7. It tends to be moved angularly in the other direction by the movement of the stud 9 toward the arc traced by the floating stud 7. The dimensions in the preferred embodiment are so selected that the back bed plate 3 takes on a slight upward angle as the beds 1 and 3 are retracted to receive a large stack of cards. This configuration conforms with all of the required accuracy to the posture of a stack of cards. In the preferred embodiment the upward angle of the second bed plate is slightly more than required to level the stack. This results in a stack slightly higher on the side away from the picker roll 50. Such a slight upward posture of the stack is not a deficiency and the dimensions chosen allow the bed plates 3 and 1 to be retracted a greater amount before the back bed plate 3 binds against the rotating guide plate 17.

The motor 27 is activated by a system which is an efficient control of document feed. To retract the bed plates 3 and 1, the motor is activated in a direction to drive the positioning block 31 downward. A switching scheme which bypasses the switch 35 can be used for this purpose. The retracting of the bed plates 3 and 1 and the loading of a stack of documents is, of course, under the manual control of a human operator. When the device is caused to feed documents, the motor 27 turns to pull the positioning block 31 upward until the motor 27 is shut off by the opening of the switch 37.

The picker roll 50 is journalled to the frame and is shown at its two extreme positions in FIGS. 3 and 4. Until the top of the stack forces picker roll 50 to the document feed position of FIG. 3, the switch projection 37 closes the switch 35, as shown in FIG. 4, and activates the motor 27. The picker roll 50 in combination with the switch 35 makes up a stack top sensing switch to automatically control document stack movement. A feature of this arrangement is that no complicated input to the motor 27 is required to control the proper position of the guide plate 17. The motor is simply caused to work until the top of the stack is at the proper position, at which time the motor is automatically deactivated. After one or several cards are fed, the switch remakes so as to feed again. As discussed in the introduction of this specification, a relatively level stack top renders the sensing by the picker roll 50 relatively accurate without critical positioning of the picker roll 50 and regardless of the number of documents in the stack.

While the invention has been particularly shown and described with reference to a preferred embodiment thereof, it will be understood by those skilled in the art that the foregoing and other changes in form and details may be made therein without departing from the spirit and scope of the invention.

We claim:

1. Stack presenting means comprising in combination:
a pivoted guide arm,
a first bed plate linked to said guide arm for movement which is a function of the movement of said guide arm,
a second bed plate linked to said guide arm for movement which is a function of the movement of said guide arm, and
means to rotate said guide arms to move said first and said second bed plates, said linkages being adapted to position said bed plates approximately flat along a document feed path when said guide arm is at one angle, and being adapted to conform said bed plates to a position to level the top of a stack of uneven thickness documents when said guide arm is at a second angle.

2. The combination as in claim 1 also comprising a motor to rotate said guide arm and means sensitive to the presence of the top of a stack of documents at a predetermined level to activate and deactivate said motor.

3. The combination as in claim 2 wherein said motor is journalled to a stationary point and carries a lead screw and also comprising a positioning block with a shaft receiving said lead screw, and a rigid arm journalled to said positioning block and rigidly connected to said guide arm for turning said guide arm.

4. Stack presenting means comprising in combination:
a pivoted guide arm,
a first bed plate rigidly mounted to said guide arm at an angle,
a second bed plate linked to said guide arm for movement which is a function of the movement of said guide arm, and
means to rotate said guide arm to move said first and said second bed plates.

5. The combination as in claim 4 wherein said second bed plate is pivoted to said guide arm and is pivotally connected through a rigid link to a pivoted, rigid positioning link the end of which traces a path which approaches the path traced by the end of said guide arm.

6. The combination as in claim 5 wherein said pivoted positioning link is pivoted at a point beneath said second bed plate and away from both said second bed plate and the pivot point of said guide arm.

7. The combination as in claim 6 also including a pivotally mounted motor carrying a lead screw, a positioning block with a threaded shaft receiving said lead screw, and a rigid arm journalled to said positioning block and rigidly connected to said guide arm to rotate said guide arm.

8. The combination as in claim 7 also comprising means sensitive to the presence of the top of a stack of documents at a predetermined level to activate and deactivate said motor.

9. Stack presenting means for feeding from the top of a stack of sheets comprising in combination:
a frame to support said stack presenting means,
a guide member journalled to the frame and carrying a first bed plate rigidly mounted on it at an angle so that said first bed plate is at least approximately flat with a sheet feed path when said guide member is at one position,
a second bed plate linked to said guide member so that said second bed plate is at least approximately flat with said sheet feed path when said guide member is at said one position and linked for movement which is a function of the movement of said guide member, and
means mounted to the frame to rotate said guide arm to retract and advance said guide member between said one position and a second position at which said first bed plate makes a substantial angle down from said sheet feed path.

10. The combination as in claim 9 wherein said second bed plate is pivoted to said guide member at a point near said first bed plate and is pivotally connected to said frame through one rigid positioning link to a second pivoted, rigid positioning link the end of which traces a path which approaches the path traced by the end of said guide member.

11. The combination as in claim 10 also comprising a motor to rotate said guide member and means sensitive to the presence of the top of the stack of a predetermined level to activate and deactivate said motor.

12. The combination as in claim 11 wherein said second positioning link is pivoted at a point beneath said second bed plate and away from both said second bed plate and the pivot point of said guide arm.

13. The combination as in claim 12 wherein said motor is journalled to said frame and carries a lead screw and also comprising a positioning block with a shaft receiving said lead screw, and a rigid arm journalled to said positioning block and rigidly connected to said guide member for turning said guide member.

14. The combination as in claim 13 wherein said guide member, said first bed plate, and said second bed plate are plates at least as wide as said sheets and said positioning link is a thin member pivoted to one side of the frame and also comprising a second positioning link mounted to said frame as said first positioning link on the other side of said guide member for balanced support of said second bed plate.

References Cited by the Examiner

UNITED STATES PATENTS

| | | | |
|---|---|---|---|
| 1,685,799 | 10/1928 | Baker | 271—61 |
| 2,886,314 | 5/1959 | Phelan | 271—62 |

M. HENSON WOOD, Jr., *Primary Examiner.*